United States Patent [19]

Pasquariello

[11] Patent Number: 5,721,929
[45] Date of Patent: Feb. 24, 1998

[54] METHOD FOR EXTENDING A FOURTH GENERATION PROGRAMMING LANGUAGE

[75] Inventor: Greg Pasquariello, Littleton, Colo.

[73] Assignee: Electronic Data Systems Corporation, Plano, Tex.

[21] Appl. No.: 539,515

[22] Filed: Oct. 6, 1995

[51] Int. Cl.$^6$ ...................................................... G06F 9/44
[52] U.S. Cl. ........................................... 395/710; 395/685
[58] Field of Search .................................. 395/701, 710, 395/685, 680

[56] References Cited

U.S. PATENT DOCUMENTS

| | | | |
|---|---|---|---|
| 5,497,491 | 3/1996 | Mitchell et al. | 395/700 |
| 5,515,536 | 5/1996 | Corbett et al. | 395/700 |

OTHER PUBLICATIONS

"Customizing C++ to Improve the Reusability of Class Libraries", Kojima et al. IEEE 1994, pp. 64–73.
"Class Modules in Object Oriented Software Development", Zhu, COMPSAC 1991, pp. 529–530.
"Object Exchange Service for an Object–Oriented Database System", Pathak et al., Data Engg., 1989 5th Int'l Conf., pp. 27–34.
"A Concurrent Programming Environment for Memory–Mapped Persistent Object Systems", Fu et al., 1993 Int'l Conf. on Comp. Software and Applications, pp. 291–297.

Primary Examiner—Alvin E. Oberley
Assistant Examiner—Kakali Chaki
Attorney, Agent, or Firm—L. Joy Griebenow

[57] ABSTRACT

A system for extending the capabilities of a programming language, particularly a 4GL, wherein an extension of the programming language is created as a class within the C++ programming language. The extension class must also include code to register the extension class with the programming language, so that the programming language execution engine can call the functions of the class. When the extension function receives control, it receives any parameters defined within the programming language statement that called the extension function, and it can return a value to the programming language. The extension function may call other functions of the programming language, and it may call any other types of functions, therefore, the extension function has complete control over its domain and scope.

11 Claims, 6 Drawing Sheets

```
STEP 1: INCLUDE      { #include <external.h>
EXTERNAL.H           { #include <math.h>

STEP 2: CREATE       { class IsNumericClass : public External {
THE ISNUMERIC        { public:
CLASS SUBCLASS STEP 3: DEFINE       { External *NewInstance (EngineContext &ec) {
THE CONSTRUCTOR      { IsNumericClass: External(ec){}
METHOD STEP 4: DEFINE         Value *Execute(int ExpectingReturn) {
A PUBLIC EXECU-          if (parmStack -> Test != 1){
TION METHOD TO             Warning (new
DETERMINE IF               ParameterCountError);
THE ARGUMENT               return CreateValue(OL);
IS NUMERIC               }
                         Value *var=parmStack->Pop();
                         const char *ptr=(const char *)*var;
                         while (*ptr) {
                           if (!(isdigit(*ptr))) {
                             return createValue(OL);
                           }
                           ptr++;
                         }
                       }
```

*FIG. 2A*

```
return createValue(((ptr == (const
char*)*var) ? 0L: 1L));
}
};
```
STEP 5: RETURN A POINTER TO AN INSTANCE OF THE VALUE CLASS

```
void initializeMiscExtensions ()
{
(new IsNumericClass(ec)) ->
Register("dbiIsNumeric");
}
```
STEP 6: REGISTER THE SUBCLASS

```
retval = dbiIsNumeric (3);
```
STEP 7: CALL THE SUBCLASS FROM WITHIN THE LANGUAGE

FIG. 2B

METHOD FOR EXTENDING A FOURTH GENERATION PROGRAMMING LANGUAGE

FIELD OF THE INVENTION

This invention relates to computer systems and more particularly to programming languages within such computer systems. Even more particularly, the invention relates to a method for allowing a user to extend the functionality of a fourth generation programming language by incorporating arbitrary functions.

BACKGROUND OF THE INVENTION

In prior art systems, the primary method used to extend a programming language is by creating a product with an open architecture and defining an interface. The interface technique is a common method for the user to communicate with the product. This interface both defines and provides the user with access to modify the product. An interface, by definition, limits the user by the domain and scope of the interface.

When using the interface approach, there are two general solutions. The first solution is to define a single application program interface (API) and provide this API in a library of functions. Each library function is defined to the detailed level of the input argument list, the output argument(s), and the processing performed by the function. These systems often define rules for the order in which functions can be executed and grouped to perform abstract operations. Thus the domain and scope of the interface limit the user.

One example of this first solution is the UNIX standard input/output package of library functions, which provides a user-level input/output buffering interface. The application program interface is provided in a header file, called "stdio.h", and library archive, called "libC.a". The user is limited by the domain, which is the input and output of data, and the scope, which is the abstract object "FILE" and the available functions in the library. The user does not have control over the inputs, processing or outputs of these functions. Only functions related to this domain and scope are available to the user, for example opening a file, reading a character, writing a buffer and closing a file, etc. Functions not supported by this API include filtering input or output with an argument specifying the filter, striping data across a list of disks specified in an argument, parallelizing the output of data, etc.

Therefore, the main disadvantages of this first solution are the limited set of functions, and the inability to modify the interface. The processing and data defined by the product is encapsulated within the product. The only way to alter the processing and data is by using and combining the functions defined and provided in the application program interface.

The second solution is the definition of a layered application program interface provided in several libraries. Each library provides a different level of abstraction ranging from a low level to high level interface. Each library is composed of functions, with each function being defined in detail, including an input argument list, output arguments and the processing performed by the function. Rules define the order in which functions can be executed and grouped to perform abstract operations. Again, the domain and scope of the layered interface limit the user.

One example of this second solution is the X Window System, typically found in the UNIX operating system. The X Window System provides a layered application program interface in several libraries. The most widely used low-level interface to X is a library of functions known as Xlib. This library defines a set of functions that provide complete access and control over the display, windows and input devices. X Window System applications can be built with the low-level X functions in Xlib, but it can be tedious and difficult to use. The X Window System Toolkit is a standard toolkit which provides two additional layers on top of the functions of Xlib. These libraries are known as Xt Intrinsics and include a set of user interface functions known as widgets. One common set of widgets is the Open Software Foundation Motif widget set.

The Motif widgets implement user interface components with a specific look and feel. Examples include scroll bars, menus, list boxes and buttons. The Xt Intrinsics library includes functions which allow the widgets to be combined to produce a complete graphical user interface.

Only functions related to the X Window System domain and scope are available to the user. The Xlib library provides functions supporting graphic primitives and interclient communication. Graphic primitives include drawing a point, drawing a line and drawing polygons and arcs. The Xt Intrinsics library provides functions to display widgets, callback functions to handle an action associated with selecting a button, and convenience functions which simplify creating some user interface components (e.g., pop-up menus).

Functions outside of the X domain and scope defined above are not available to the user. The user is limited to the methods provided for interclient communication. The user cannot alter or implement a user defined method. Although new widgets can be implemented, they are limited by the functions in the various libraries and the legal combinations of these functions. Therefore, the main disadvantage of this second method is the limited ability to extend the interface. The new widgets which can be implemented are constrained by the underlying functions. Only graphical user interface components can be created.

In summary, the primary methods for creating a product with an open architecture places severe limitations on the user by using a well defined interface. The interface defines a common communication interface between the processing and data encapsulated in the product and the user. The user is forced to stay within the boundaries defined by the interface to protect the integrity of the encapsulated processing and data. Thus the user is limited by the domain and scope of the interface.

It is thus apparent that there is a need in the art for an improved method or apparatus which allows a user complete control over the domain and complete control over the scope of the functions when writing an extension to a system, such as a programming language. The present invention meets this and other needs in the art.

SUMMARY OF THE INVENTION

It is an aspect of the present invention to provide a method that allows a user to extend a programming language.

It is another aspect of the invention to allow a user to incorporate a user-defined function into the language.

Another aspect is to provide the user-defined function with complete access to the facilities of the language.

The above and other aspects of the invention are accomplished in a system wherein an extension of the programming language is created as a class within the C++ programming language. The class is derived from another class called "External", in order to inherit needed functions. The extension class must also include code to register itself with the programming language, so that the programming language execution engine can call the functions of the class.

When the extension function receives control, it receives any parameters defined within the programming language statement that called the extension function, and it can return a value to the programming language. The extension function may call other functions of the programming language, and it may call any other types of functions, therefore, the extension function has complete control over its domain and scope.

BRIEF DESCRIPTION OF THE DRAWINGS

The above and other aspects, features, and advantages of the invention will be better understood by reading the following more particular description of the invention, presented in conjunction with the following drawings, wherein:

FIGS. 2A and 2B show an example of an extension with the present invention;

DESCRIPTION OF THE PREFERRED EMBODIMENT

Figure 1:
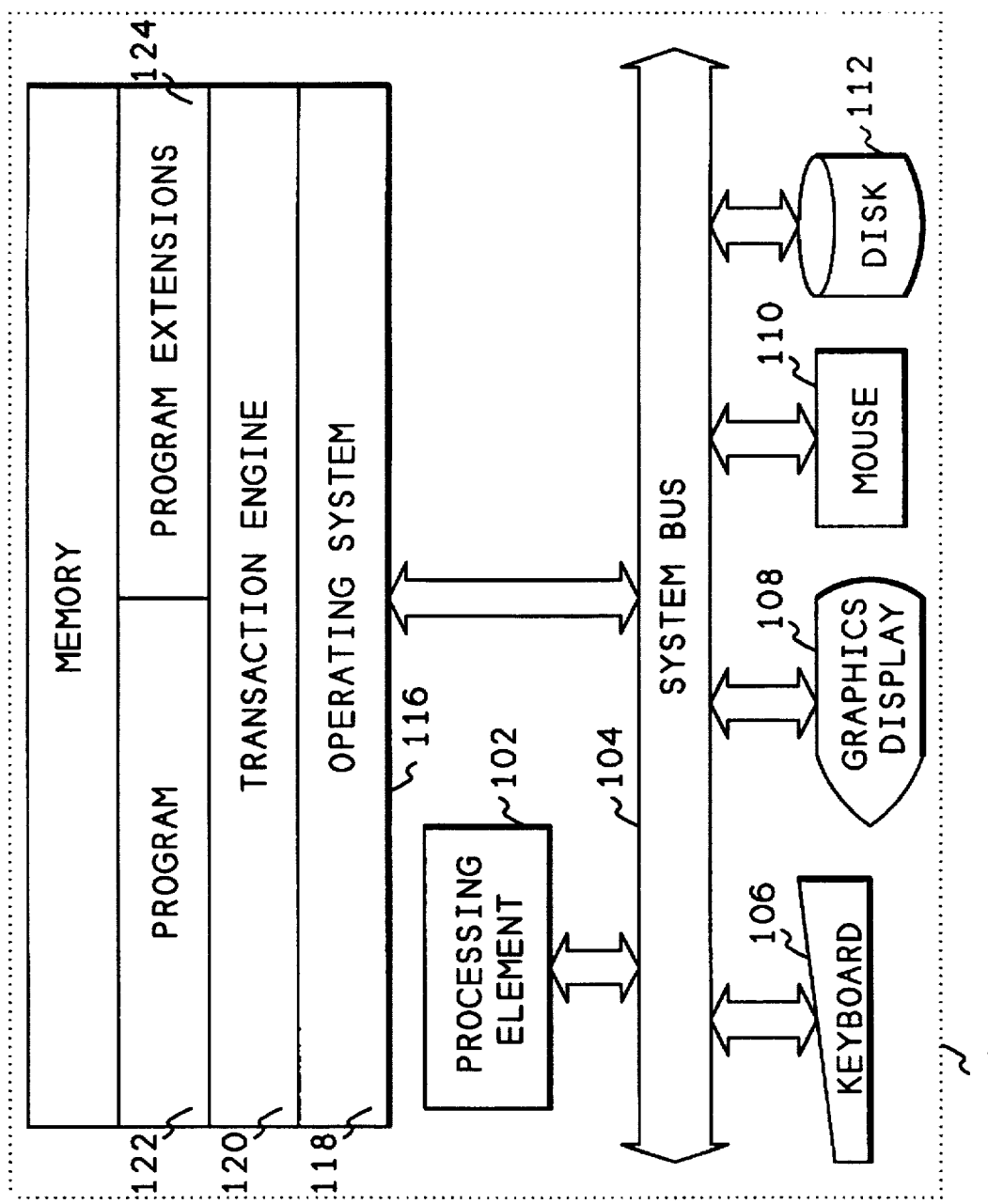
FIG. 1 shows a computer system incorporating the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

The present invention overcomes the limitation of prior art methods used to build products with an open architecture. The invention provides an extremely open architecture in terms of the capability to extend the functionality of a programming language, and gives the user complete control over the domain and scope of the interface. Additionally, the user has complete access to all of the functionality of the programming language. The open architecture enables the user to easily interface the user's business applications and third party software.

All C++ extensions provided by the invention follow a simple class template, as described below. The new class created to extend the programming language must be a derived class of the External class provided in the programming language, it must include a constructor to pass the engine context to the base class and it must include a member entitled "Execute" of type "Value *". The "Execute" member may include one argument of type "int", which indicates whether the caller of the function expects a return value. Based on the value of this argument, a return value of type "Value *" is returned or zero is returned. The user is free to define the processing for the class, including data members and other member functions of any access type. Therefore, the user has complete control over the domain and scope of the extension.

An example of defining such a class is:

```
class NewCustomClass : public External
{
private:
//
//       User defined private data and function members
//
protected:
//
//       User defined protected data and function members
//
public:
     NewCustomClass (EngineContext &ec) : External (ec){ }
         Value *Execute (int expectingReturn);
//
//       User defined public data and function members
//
};
Value* NewCustomClass:: Execute (int expecting Return)
{
/
//       User defined processing such as a new algorithm,
//       interface to user's business application or
//       interface to third party appliaation
//
if (expectingReturn)
     {
     if (error)
          return (CreateValue (0L));
     else
          return (CreateValue (1L));
     }
else
     return 0;
}
``` wherein the underlined class and variable names would be changed for each specific class being created.

In addition to the template for C++ extensions, the invention includes methods which give the user complete control over the input to and output from an extension. The input is popped from a conventional stack and output is pushed onto a conventional stack. The Value class is used to input and output data, although those skilled in the art will recognize that any arbitrary data type could be used for input and output of data. The value class supports returning basic types, such as integer, long, double, char, char *, and complex types such as an array.

The first example shown below defines how a file name would be input to an extension expecting a single argument representing a file name. The user can test the stack to verify that the argument was passed by the caller. In this example, one argument is expected, so a test of greater than or equal to 1 is used. The user implementing the extension defines the number of arguments and defines the method for verifying that all arguments are supplied by the caller.

```
if (parmStack->Test( ) >= 1)
     Value *fileName = parmStack->Pop( );
```

The next example shown below defines how an extension would return data in the argument list, thus allowing the extension to return an arbitrary amount of data. For example, a function "findFile" is implemented by a C++ extension "FindFileClass". The syntax for using this extension is "error=findFile (criteria, filename)" where the caller defined criteria for finding a file is stored in "criteria", the file name matching the criteria is returned in "fileName" and "error" is equal to one for success and is equal to zero if a failure occurs. Therefore, the functions pops the arguments off the stack and assigns the file name found to the appropriate argument.

```
Value *criteria = parmStack->Pop( );
Value *fileName = parmStack->Pop( );
*fileName = (const char*) fileNameMatched;
```

The next example shown below defines how an extension would execute a function of the programming language from within the C++ extension and pass arguments to the programming language function. For example, a programming language function "openFile" is implemented by a C++ extension "OpenFileClass". The syntax is "error=openFile (fileName)" where the caller supplied file name is the file to be opened and "error" will be set to one for success and set to zero for failure.

First, the extension function gets a handle to an instance of the programming language function to be executed. This handle is of type "Module *" and the name of the function is used to get the handle. Second, the handle is used to create a parameter stack and the argument list is pushed onto the stack. Last, the handle is used to execute the function. All programming language functions implemented as a C++ extension have an "Execute" member, so this member is used to perform the function.

```
Module *openFile = engineContext.GetModule ("openFile");
openFile ->parmStack = new ParameterStack;
openFile ->parmStack-> Push (fileName);
Value *returnValue = openFile ->Execute ( );
```

Last, a C++ extension is made accessible from within the programming language by registering the extension with the transaction engine of the language. The transaction engine is that part of the programming language that executes programming language statements and a component defines the domain for the functions within the component.

Extensions are registered by the transaction engine from within a C++ file called "extend.cc". This file contains a function prototype to execute containing source code to register extensions for a particular component and a function "intializeExtensions" which executes the prototype. The example shown below indicates the code previously defined and the code added to register functions for a new component.

```
//
// Prototypes for previously defined components
//
void initializeNewComponent (EngineContext &);
void initializeExtensions (EngineContext &ec)
{
//
// Execution for previously defined components
//
initializeNewComponent (ec);
}
```

The definition of the prototype function is located in component's source code. All functions in the component which are accessible from the programming language are registered from within the function "initializeNewComponent". The next example show below defines the prototype function mentioned above and registers two extensions used in previous examples.

```
void initializeNewComponent (EngineContext &ec)
{
(new FindFileClass (ec))->Register ("findFile");
(new OpenFileClass (ec))->Register ("openFile");
}
```

FIG. 1 shows a block diagram of a computer system incorporating the present invention. Referring now to FIG. 1, a computer system 100 contains a processing element 102 that communicates with other elements of the computer system 100 over a system bus 104. A keyboard 106 and a mouse device 110 allow input to the computer system 100 while a graphics display 108 allows software within the computer system 100 to output information to a user of the system. A disk 112 stores the data and processes of the present invention.

A memory 116 contains an operating system 118, which is typically the Unix Operating System, although any other operating system will work in a similar manner with the invention. The program language extension of the present invention is embodied within a transaction engine 120, a program 122, and program extensions 124.

FIGS. 2A and 2B show an example of an extension used with the present invention. Referring now to FIGS. 2A and 2B, step 1 shows that the extension must include a header file named "external.h", because the extension class must be derived from a class called External and the definition for the External class is in the header file external.h. In the example of FIG. 2A, the extension also includes a header file named "math.h", however, this file is specific to the particular code within the extension example and would not be needed in other extensions.

Step 2 shows that the extension must be created as a C++ class which is derived from the External class. This is necessary in order to inherit the characteristics of the External class, in particular the register function which must be called to identify the extension class to the programming language.

Step 3 shows that the extension must define a constructor method in order to pass the engine context to the base class, the External class. The engine context is a set of data used by the programming language in interpreting the statements of the programming language. All interpreted programming languages have an equivalent to the engine context.

Step 4 shows that the extension must define a public function having the name "Execute", and this function must have a type of "Value *". Those skilled in the art will recognize that any type could be used, and that the type "Value *" is specific to this particular implementation. The Execute member should include one argument of type "int", and this argument indicates whether the caller of the function is expecting a return value. The value for this parameter would typically be one if the caller is expecting a return and zero is the caller is not, although those skilled in the art will recognize that this parameter could be set to any value so long as the caller and the creator of the extension each understand the meaning of the value.

Step 5, shown in FIG. 2B, shows that the return value should be returned as a pointer to an instance of the value class, in this particular example.

Steps 1 through 5 are an example of the code that would be included in the actual extension. Step 6 shows code that is placed into a file named "extend.cc", and this code causes the functions within the class to be registered, so that they can be called from a program statement within the programming language.

Step 7 shows an example of calling the extension function from within the programming language. As step 7 shows, the call to the extension function is done in a conventional manner, and requires no unusual adaptations because of the function being an extension function.

Figure 3:
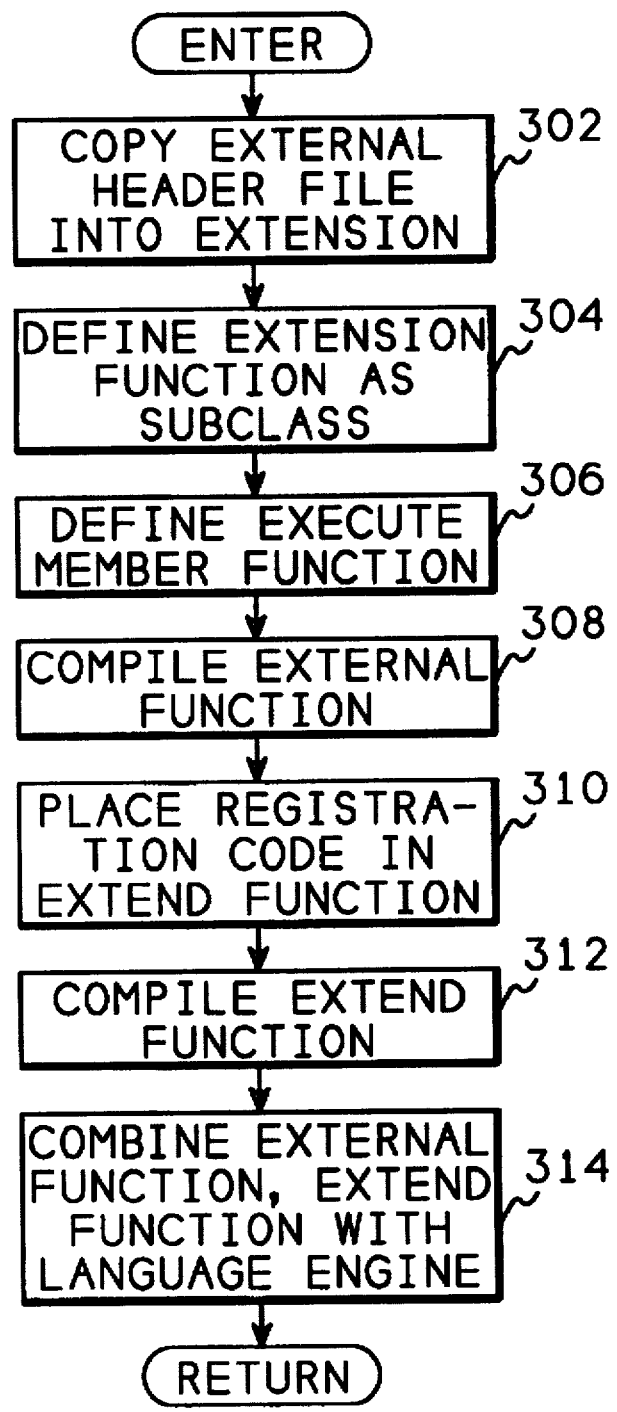
FIG. 3 shows a flowchart of the process of creating an extension with the present invention.

FIG. 3 shows a flowchart of the process for creating an extension. Referring now to FIG. 3, block 302 shows that to create an extension the user must copy the external header file into the extension. Block 304 shows that the extension must be defined as a subclass of the External class, and block 306 shows that the extension must define an Execute member function. Once all this is accomplished, block 308 shows that the external function must be compiled and block 310 shows that the registration code must be placed in the "extend.cc" file. Block 312 compiles the "extend.cc" file, and block 314 links the external class, with the extension class and the extend.cc file, along with the transaction engine. Once this is done, the extension is usable from within the language.

Figure 4:
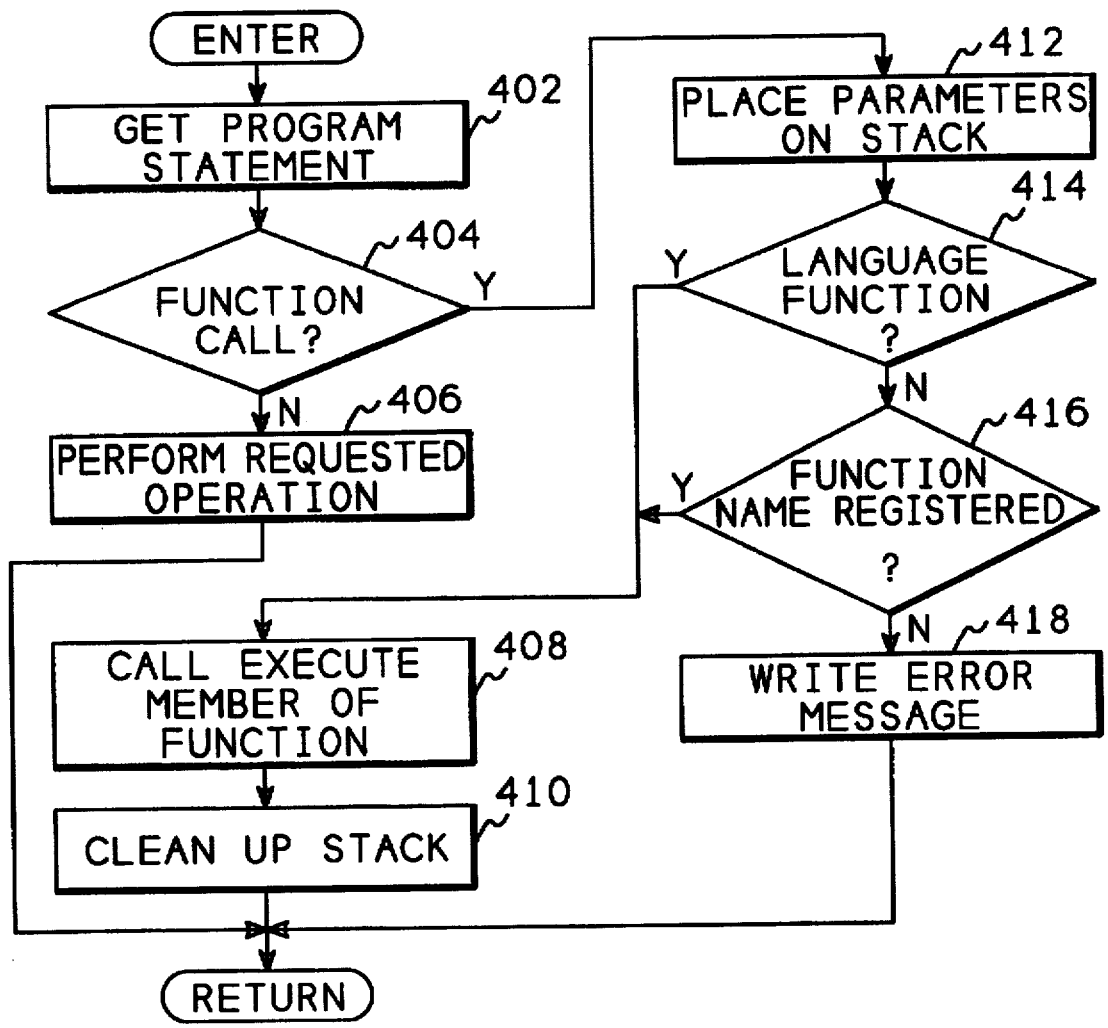
FIG. 4 shows a flowchart of a portion of the transaction engine of the present invention and how this engine performs a function within an extension.

FIG. 4 shows a flowchart of a portion of the transaction engine of the present invention and how this portion performs the function within an extension. The "transaction engine" is that part of the programming language interpreter that reads programming statements, determines what these statements do, and performs the function intended by the statement. That is, the transaction engine performs the interpretation within an interpreted programming language. Thus, the transaction engine is the part of the programming language that must also determine that the function being called is an extension, set up all the necessary information for the extension and call the extension so that the extension can perform the intended operation. Thus, the transaction engine is the main interpreter for the programming language as well as the extensions of the present invention.

Referring now to FIG. 4, after entry, block 402 gets the next program statement from within the user program. Block 404 then determines whether the statement is a function call, and if not, block 404 transfers to block 406 which performs whatever requested operation is in the programming statement. After completing the operation, control returns to the caller of this portion of the transaction engine.

If block 404 determines that the program statement is a function call, block 404 transfers to block 412 which places, on a stack, any parameters defined in the programming language statement for the function call. Block 414 then determines whether the function is a known function within the programming language. That is, is the function a part of the existing programming language. If the function is known within the language, block 414 transfers to block 408 which calls the Execute member function to perform the operation of the function. After the function returns, block 410 cleans up the stack to insure that nothing is left on the stack before returning to the caller of the engine.

If the function is not part of the language, block 414 transfers to block 416 which determines whether the function is part of a registered extension. If the function name has been registered, block 416 transfers to block 408 which calls the Execute member function and then block 410 cleans up the stack before returning to the caller. If the function is not a registered function, block 416 transfers to block 418 which writes an error message indicating that an attempt was made to call an unknown function.

Figure 5:
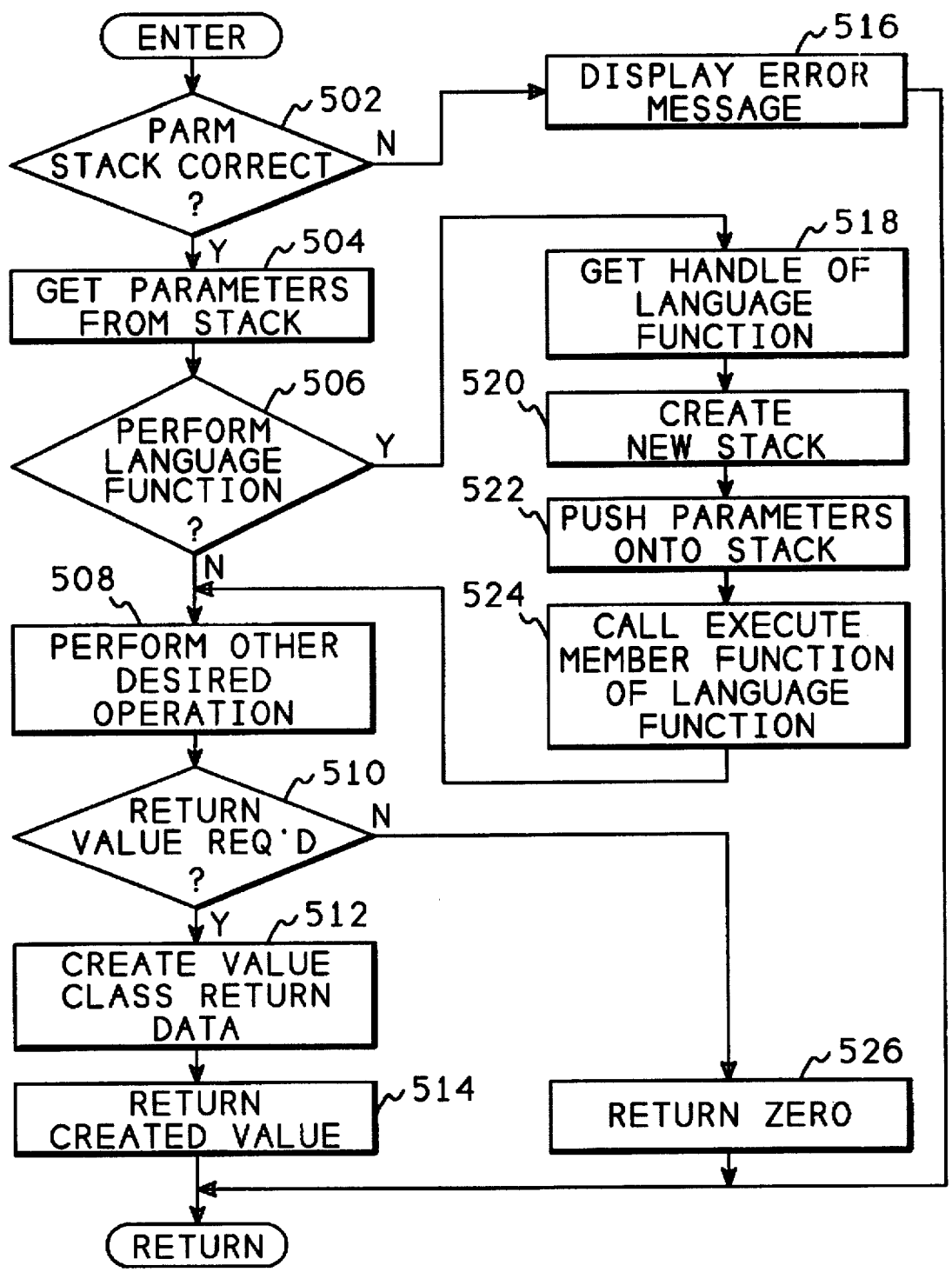
FIG. 5 shows a flowchart of the operation of an extension within the present invention.

FIG. 5 shows a flowchart of the operation of an extension within the present invention. Referring to FIG. 5, after entry, block 502 checks the parameter stack to make sure that the number of parameters passed is the number needed by the extension. If the number is incorrect, block 502 transfers to block 516 which displays an error message before returning to the transaction engine.

If the number of parameters is correct, block 502 transfers to block 504 which retrieves the needed parameters from the stack and then block 506 determines whether the extension will perform a function that is a part of the programming language. That is, the extension is allowed to call functions that are built into the programming language, as part of the operation of the extension.

If the extension does need to call a programming language function, block 506 transfers to block 518 which calls the transaction engine to get a "handle" of the language function. A "handle" is some form of pointer to the language function. This pointer may be an actual address of the function, or it may be an integer which represents the particular function needed, or it may be some other form.

After obtaining the handle, block 520 creates a new parameter stack and then block 522 pushes parameters, for the programming language function being called, onto the stack. Block 524 then calls the Execute member of the programming language function in the same way that the transaction engine calls the Execute member of an extension.

After the programming language function is complete, or if no programming language functions are needed by the extension, control goes to block 508 which performs any other desired operations within the extension. These operations can include calling any other programs defined within the extension, or programs or functions purchased from third party vendors. In this manner, the programming extensions allow the use of third party software, which typically is not usable by other fourth generation programming languages.

Block 510 then determines whether a return value is required and if not, transfers to block 526 which simply returns the value zero. If a return value was required, block 510 goes to block 512 which creates a Value class object to return the data and then block 514 returns the object created in block 512.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for extending the functionality of an existing programming language comprising the steps of:
   (a) defining an extension class to perform the extending of functionality, wherein the extension class has an extension class name and is derived from a predefined class within the existing programming language;
   (b) defining an execute member function within the extension class;
   (c) registering the extension class by calling a registration function inherited from the predefined class; and
   (d) within the existing programming language, performing the extension class, comprising the steps of
      (d1) recognizing that a programming language statement contains a function call to a function not defined within the programming language, the function having a function name,
      (d2) locating the function name within a list of registered functions, wherein the function name defines the extension class name, and (d3) calling the execute member function defined in step (b).

2. The method of claim 1 wherein step (d3) further comprises the steps of:
(d3a) placing function call parameters from the programming language statement on a stack; and
(d3b) passing the stack to the extension class.

3. The method of claim 2 wherein step (b) further comprises the step of examining a number of parameters on the stack and discontinuing operation if the number of parameters is incorrect.

4. The method of claim 1 wherein step (b) further comprises the following steps (b1) and (b2) and wherein step (d3) further comprises the following steps (d3a) and (d3b):
(b1) receiving a return indication parameter into the execute member function, wherein the return indication parameter indicates that a return value is expected;
(b2) returning a return value when the return indication parameter indicates that a return value is expected;
(d3a) creating the return indication parameter; and
(d3b) passing the return indication parameter to the execute member function.

5. The method of claim 1 wherein step (b) further comprises the steps of:
(b1) for each programming language function being called within the execute member function
(b1a) locating the programming language function within the programming language,
(b1b) creating a stack for the programming language function,
(b1c) placing parameters for the programming language function on the stack, and
(b1d) calling an execute member function of the programming language function.

6. The method of claim 1 wherein the registering of step (c) is performed outside the extension class.

7. A method for extending the functionality of an existing programming language comprising the steps of:
(a) defining an extension class to perform the extending of functionality, wherein the extension class has an extension class name and is derived from a predefined class within the existing programming language;
(b) defining an execute member function within the extension class;
(c) defining a call to a registration function within a function incorporated into the programming language,
and registering the extension class by performing the call to the registration function; and
(d) within the existing programming language, performing the extension class, comprising the steps of
(d1) recognizing that a programming language statement contains a function call to a function not defined within the programming language, the function having a function name,
(d2) locating the function name within a list of registered functions, wherein the function name defines the extension class name, and
(d3) calling the execute member function defined in step (b).

8. The method of claim 7 wherein step (d3) further comprises the steps of:
(d3a) placing function call parameters from the programming language statement on a stack; and
(d3b) passing the stack to the extension class.

9. The method of claim 8 wherein step (b) further comprises the step of examining a number of parameters on the stack and discontinuing operation if the number of parameters is incorrect.

10. The method of claim 7 wherein step (b) further comprises the following steps (b1) and (b2) and wherein step (d3) further comprises the following steps (d3a) and (d3b):
(b1) receiving a return indication parameter into the execute member function, wherein the return indication parameter indicates that a return value is expected;
(b2) returning a return value when the return indication parameter indicates that a return value is expected;
(d3a) creating the return indication parameter; and
(d3b) passing the return indication parameter to the execute member function.

11. The method of claim 7 wherein step (b) further comprises the steps of:
(b1) for each programming language function being called within the execute member function
(b1a) locating the programming language function within the programming language,
(b1b) creating a stack for the programming language function,
(b1c) placing parameters for the programming language function on the stack, and
(b1d) calling an execute member function of the programming language function.

* * * * *